3,412,699
FUEL FEEDING APPARATUS
Samuel K. Culp, Barberton, and Robert R. Piepho, Wadsworth, Ohio, assignors to The Babcock & Wilcox Company, New York, N.Y., a corporation of New Jersey
Filed Mar. 22, 1966, Ser. No. 536,470
11 Claims. (Cl. 110—101)

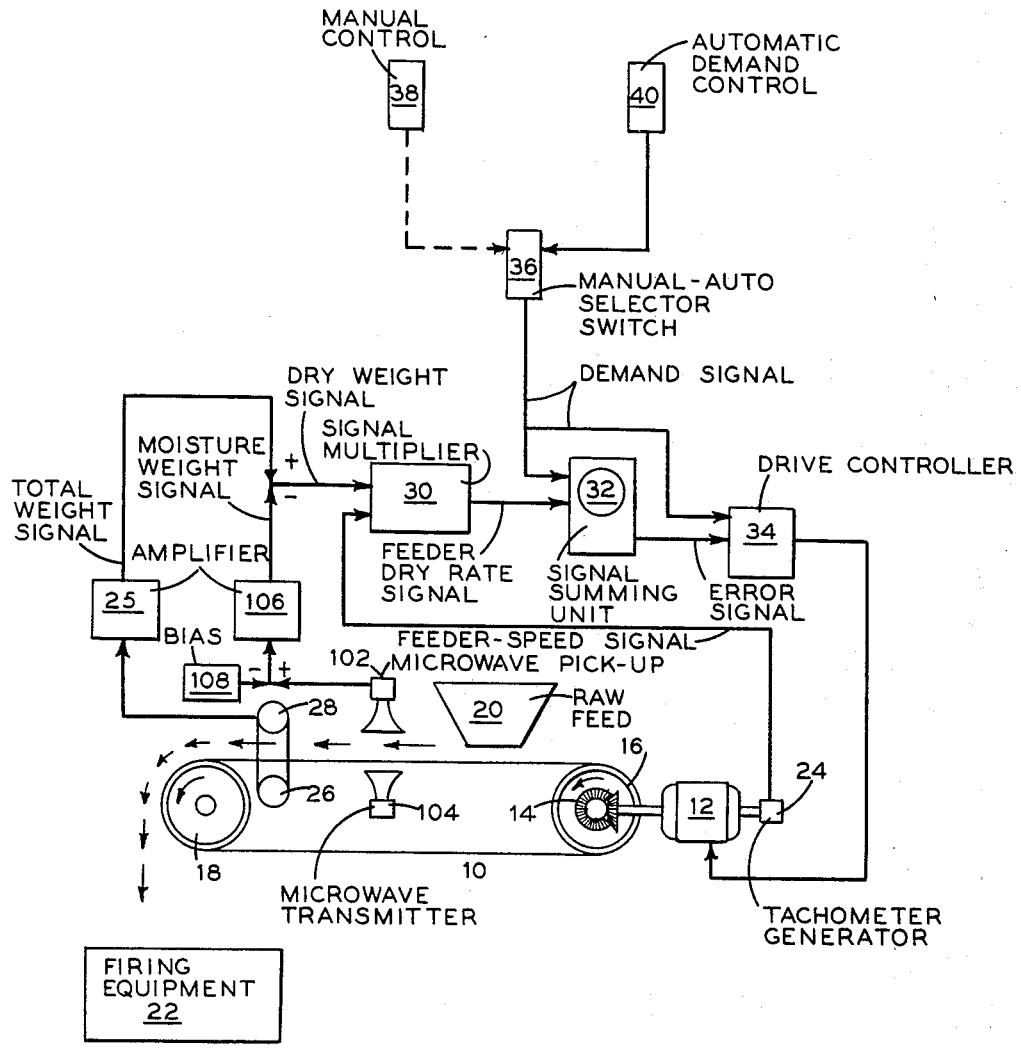

ABSTRACT OF THE DISCLOSURE

This invention is a fuel feeding arrangement utilizing a nuclear radiation and detection scheme for continuously sensing the combustible quality of fuel being conveyed to a fuel burner and adjusting the speed of delivery thereof in response to a continuous measurement representative of the desired rate of delivery. It is a further feature of the invention to utilize a microwave radiation and detection scheme for sensing the moisture content of the fuel while it is being delivered and adjusting the speed of delivery thereof on the basis of the dry fuel equivalent of the fuel being delivered.

---

This invention relates to apparatus for feeding fuel to fuel burning equipment; and it is especially applicable to apparatus of this kind which includes a plurality of conveyor belts for feeding particulate solid fuel, such as coal.

More particularly, the apparatus of the present invention has an improved control for sensing belt burden and for adjusting the speed of individual conveyor belts in compensation for variations in belt burden, to thereby ensure that a single belt or the several belts will deliver fuel at substantially the same mass rate. This provision thus ensures that each fuel firing component of a large furnace, for example, may contribute uniformly to its total heat input, since the fuel firing components may be uniformly loaded and the total heat input can be more evenly distributed throughout the furnace.

Various apparatuses are now in common use for controlling the supply of solid fuel to fuel burning equipment. One form of such apparatus is a gravimetric device which includes a conveyor belt having a weigh span for measuring belt burden over a predetermined length of the belt so that with knowledge of belt speed it is possible to determine the fuel feeding rate and adjust accordingly. However, a weigh span has the disadvantage of coming into direct contact with the length of belt being weighed, and may include some combination of first and second class levers in a complex mechanical system which performs a force-reducing action and applies the load force at a single point for convenient measurement, together with the further disadvantage of weighing all of the moisture in the fuel along with the combustible ingredients. As a result, simplicity and accuracy are sacrificed in order to measure weight on a moving belt by mechanical means.

Prior art efforts have also been directed to more simplified devices which determine the fuel feeding rate by volumetric measurement of belt burden, with a gate being employed to adjust the height of the solid fuel on the belt to thereby obtain the desired fuel feeding rate. In other words, with knowledge of belt speed, the volumetric rate of fuel delivery, and an estimate of fuel weight for a given volume, it is possible to determine approximate fuel feeding rate in terms of weight per unit of time at a given instant and to adjust the fuel feeding rate by raising or lowering the gate. Although the volumetric measurement approach satisfies the desire for simplified apparatus, it will be appreciated that variations in fuel density and size, moisture content, and ash content from batch to batch will adversely affect the accuracy of this form of fuel rate determination and feeding rate regulation.

In accordance with the present invention, apparatus of the type set forth is improved by providing a control system including a preferably elongated radioactive source which effects penetrative radiation of the fuel carried on the conveyor belt. A radiation detector measures the degree of radioactive penetration of the fuel and produces an output signal insensitive to fuel sizing consist, the strength of which is a function of the mass density of the fuel on the belt. By multiplying the output signal of the radiation detector with another generated signal which is a function of belt speed the product signal is a function of actual fuel feeding rate; and this signal may be compared with a load demand signal which is a function of the desired fuel feeding rate in order to obtain, by difference, an error signal which is utilized to adjust belt speed to make the actual fuel feeding rate correspond with the desired fuel feeding rate.

A modified form of the invention incorporates, in addition to the improved belt loading control, a moisture compensation device which beams microwaves through the fuel on the belt, with the degree of microwave attenuation being distinctively related to the moisture content in the fuel. The signal which is a function of total fuel mass can be reduced to the extent that moisture is present in the fuel, to thereby yield a signal which is a function of dry fuel mass. The rate signal can now be generated from a belt speed signal and a dry fuel mass signal. Thus, the accuracy of determining and controlling the fuel feeding rate on an equivalent heat input basis is greatly improved.

In the drawings:

FIG. 3 is an illustration similar to FIG. 1, but including a moisture compensation device in the control system.

Figure 1:
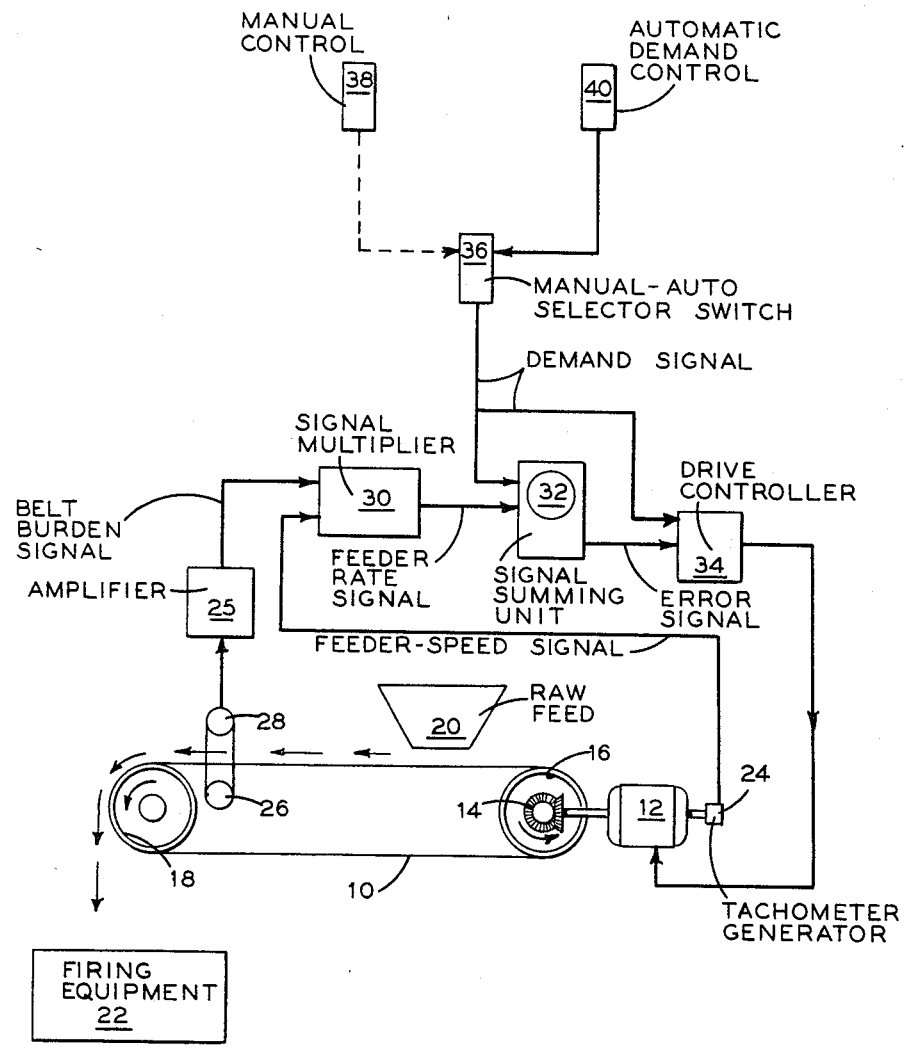
FIG. 1 is a diagrammatic illustration of fuel feeding apparatus incorporating the control system of the present invention.
Figure 2:
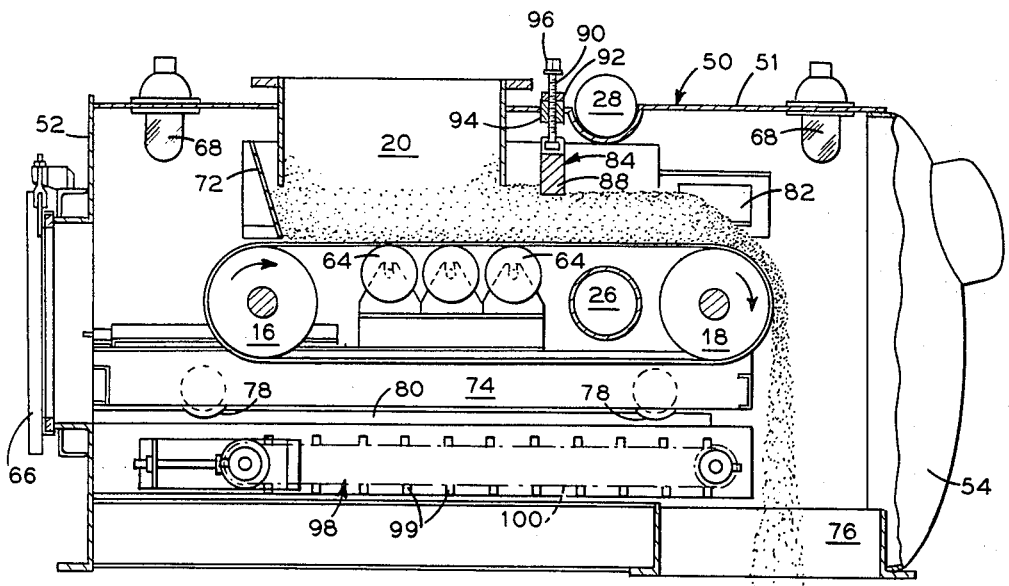
FIG. 2 is a vertical cross-sectional view of fuel feeding apparatus to which the control system of the present invention may be applied.

As shown in FIGS. 1 and 2 the device of the present invention is applied to fuel feeding apparatus including an endless conveyor belt 10 driven by a variable speed electric motor 12 through a suitable gear reduction and coupling device 14, the latter being connected between the motor shaft and one of two pulleys 16 and 18 carrying the belt 10. It is the function of the fuel feeding apparatus to convey solid fuel from a raw feed inlet 20 to firing equipment 22.

The device of the present invention serves to measure the rate of feeding fuel to the firing equipment 22 by the fuel feeding apparatus, and to controllably adjust the fuel feeding rate so that it corresponds with the desired fuel feeding rate as ditcated by the load demand. Although not shown in FIGS. 1 and 2, a plurality of feeding apparatuses is contemplated, by each having a feed rate measuring and adjusting device, and operating on concert in a given plant.

The device of the present invention and its manner of operation will be described more fully hereinafter. But it will suffice for the present to note that a tachometer generator 24 coupled to motor 12 produces an electrical signal which is a function of conveyor belt speed; that an electrical signal later amplified by an amplifier 25 is generated by a nuclear belt load sensing device including a radioactive source of penetrative radiation 26 and a radiation detector 28, vertically spaced on opposite sides of the upper run of the conveyor belt 10; that the aforesaid speed and load signals then are multiplied by a multiplier 30 to produce an electrical signal which is a function of actual fuel feeding rate; and that an electrical signal which is a function of the desired fuel feeding rate based on load demand is compared with the actual rate signal from the multiplier 30 in a summing unit 32 to produce an error signal which is relayed to a controller 34 for adjusting the speed of the motor 12 and belt 10 until the actual fuel feeding rate becomes the desired rate.

Depending upon the position of selector switch 36 the load demand signal, which is an indication of the desired fuel feeding rate, is delivered for comparison in summing unit 32 either from a manual control 38, which need not be operatively associated with the firing equipment or responsive to any condition of the combustion products or a fluid heated thereby, or from an automatic demand control 40 which is operatively associated with and responsive to the load demand signal originating in the steam generating unit.

Shown in FIG. 2 is feeder apparatus to which the present invention has been applied and which will now be described in detail. It comprises a gas tight housing 50 including a horizontally elongated tubular shell 51 and end closures 52 and 54. Disposed within the housing 50 is a horizontally elongated conveyor including an endless belt 10 carried on horizontally spaced pulleys 16 and 18 for movement in clockwise direction as viewed in FIG. 2. A series of horizontal rollers 64 is disposed intermediate pulleys 16 and 18 in contact with the underside of the top run of belt 10 to provide rolling support at the point where it would otherwise experience maximum deflection. At least one of the pulleys is in engagement with the belt 10 and is driven by the motor 12 through the gear reduction and coupling assembly 14, the details of which are omitted for the sake of clearness.

Access to the interior to the housing 50 is provided by an access door 66 which in closed position establishes a sealing relationship about an opening formed in the end closure 52. Lamps 68 are provided at opposite ends of the housing 50 to illuminate the interior thereof.

In order to introduce raw fuel from a bunker (not shown) to the interior of the housing 50, the upwardly opening inlet 20 of tubular construction extends downwardly through the top of the housing 50 adjacent the access door 66. The raw fuel from the bunker is fed through the inlet 20 and deposited on the upper surface of the conveyor belt 10 adjacent the lefthand end thereof, as shown in FIG. 2. Baffle structure 72 is employed adjacent the lower end of inlet 20 to prevent the raw fuel from overflowing the sides and the inlet end of the belt 10.

Supporting structure 74 within the housing 50 extends beneath the bottom of the belt 10. There is also provided tubular structure which opens downwardly and extends through the bottom of the housing 50 adjacent the end closure 54 to define an outlet 76 through which raw fuel is discharged at a measured rate from the righthand end of the conveyor belt 10 for conveyance to a point of use.

The conveyor described above may be adjustably positioned by wheels 78 which engage horizontally extending tracks 80 within the housing 50. With this provision, the righthand end of the conveyor belt 58 can be suitably positioned with respect to the outlet 76 in best location for raw fuel to fall freely by gravity from the belt 58 through the outlet 76. The operator can observe the discharge of fuel through the outlet 76 from an inspection window 82 in the housing 50 and then make such positional adjustments as may be necessary to permit free flow of fuel as aforesaid.

As mentioned previously, the rate at which the fuel is fed by the apparatus can be selectively adjusted by changing the speed of the belt 10. It is nevertheless desirable for control purposes to ensure that the depth of raw fuel carried on the belt 10 is of constant height. To this end, a gate assembly 84 is provided at a location between the raw feed inlet 20 and the weighing device components 26 and 28. The gate assembly 84 comprises a scraper plate 88 suspended from the top of the housing 50 and held securely in position transverse to the direction of belt movement by a series of upright bolts 90. The latter have suitable threads cooperating with respective stationary nuts 92 and threaded bushings 94 fixedly secured to the housing 50. The upper end of each bolt 90 may be provided with a head 96 of hexagonal or other suitable shape which lends itself to be turned by a tool for moving the bolt in either direction along the vertical bolt axis in order to raise or lower the scraper plate 88 relative to the upper surface of the belt 10. Preferably, the lower edge of the scraper plate 88 extends horizontally in a direction transverse to the longitudinal extent of the conveyor belt 10 and at a level below the lower end of the inlet 20 so that the fuel carried on the belt 10 will be adjusted to, and maintained at, uniform height across the entire width of the belt.

In order to remove siftings or fine particles of fuel from the bottom of the housing 50, a cleanout conveyor 98 of the so-called drag type is preferably equipped as shown with flights of scraper blades 99 protruding outwardly of a metal belt 100, the blades being arranged to scrape the bottom of the housing 50 and push the scrapings into the outlet 76. It is only necessary to operate the cleanout conveyor 98 intermittently for the purpose mentioned.

The radioactive source of penetrative radiation 26 and the radiation detector 28 are not described at full length herein, since they are well known components which are commercially available, for example, from The Ohmart Corporation of Cincinnati, Ohio. Furthermore, the details of construction of these components 26 and 28 are set forth in U.S. Patents Nos. 2,737,592, 2,964,628, and 3,019,362. It will suffice to say that the source of radiation 26 is of elongated construction adapted to be mounted in spaced parallel alignment with an elongated radiation detector 28. The source 26 comprises an elongated housing of radiation permeable material and a quantity of radioactive material such as cesium 137 or cobalt in continuous wire or strip form disposed longitudinally and uniformly throughout the length of the housing for substantially the same length as the radiation responsive detector 28. The latter includes a radiant energy electric generator comprising an elongated housing at least as long as the belt 10 is wide, with at least two chemically dissimilar electrodes disposed within the housing in contact with an ionizable gas. At least one of the electrodes is electrically insulated from the housing, and there is an electrical connection to each electrode.

The radioactive source 26 and the radiation detector 28 are disposed horizontally in spaced relationship on opposite sides of the upper run of belt 10 and at right angles to the direction of belt movement. The detector 28 generates an electrical current, the magnitude of which varies at any instant in accordance with the mass density of the material being penetrated by radiation from the radiation source 26. Stated more particularly, the current produced by the detector 28 and which flows through the electrical conductors connected to the detector electrodes will vary in a predetermined manner with the density or strength of the impinging ionizing energy from the radiation source 26. And the density of the impinging ionizing energy will vary with the mass density of the material on the belt and the radiation absorbing ability of that material. As more radiation is absorbed by the material there is less ionizing energy impinging on the detector 28, and the corresponding magnitude of the output signal from the detector is thus a function of the mass density of the material on the belt which is being penetrated at that instant. By suitable amplification of the output signal from the detector 28 and multiplication by the electrical signal from the tachometer generator 24, an instantaneous and measurable indication of the actual mass density rate of feeding fuel is obtained and, moreover, it provides the basis for adjusting belt speed to obtain the desired fuel feeding rate.

*Operation*

For manual operation the selector switch 36 is set for manual control operation and the manual control 38 is pre-set for the desired rate, for example, in tons per hour, at which fuel is to be fed to the firing equipment 22 by the individual conveyor belt 10. This feeding rate will be maintained until the controls are manually changed.

For automatic operation the selector switch 36 is set for automatic control operation, thus deactivating the manual control 38 and placing the automatic demand control 40 in operation. The latter control 40 may be responsive to furnace feedwater flow rate and/or steam temperature, to steam pressure or to the steam flow rate and/or steam temperature, or combinations of them. When any of these or other similarly employed indicators departs from the predetermined value for a given set of operation conditions a signal is produced which is a function of the discrepancy between actual and desired feeding rate, and the control apparatus automatically adjusts the speed of motor 12 and hence the fuel feed rate to provide the quantity of fuel needed to maintain the desired load conditions.

Whether the demand signal is from the manual control 38 or the automatic control 40, it is constantly being compared with the actual fuel feeding rate by the summing unit 32. Departures from control set points produce an error signal which is transmitted to the drive controller 34. It is the function of the drive controller 34 to convert the error signal into an adjusted driving current for the motor 12 which makes the motor turn at a speed which will move the conveyor belt 10 at a speed which will deliver fuel at the demanded rate, while simultaneously taking into account the instantaneous measurement of the mass density of the fuel carried on the belt.

Although not shown, it is contemplated that each conveyor belt 10 will operate independently to feed an operatively associated fuel firing component, such as a cyclone furnace, here schematically indicated as firing equipment 22, with each firing component being arranged to supply heat to a common furnace chamber such as that of vapor generating apparatus described and shown in U.S. Patent No. 3,172,395.

FIG. 3 arrangement

Shown in FIG. 3 is an arrangement similar to the arrangement of FIG. 1, but with the addition of a moisture compensation device and associated circuitry in order to modify the actual rate signal so that it is now a function of the rate at which dry coal is being fed by the apparatus.

Those reference numerals in FIG. 3 identical to reference numerals used in FIGS. 1 and 2 denote similar components having correspondingly similar functions in the two arrangements. Therefore, a discussion of such duplicated parts and their functions will not be repeated for the sake of brevity.

The modified arrangement of FIG. 3 includes a microwave pickup or receiver 102 which receives microwaves transmitted from a microwave transmitter 104 and beamed through a portion of the fuel carried on the belt 10. Moisture or water is unusually more effective than other known materials for attenuating microwaves so that the strength of the microwave beam will be reduced in proportion to the moisture content of the fuel subjected to the microwaves. The output signal of the receiver 102 can be biased against a fixed zero moisture signal of greater strength and opposite polarity from a biasing source 108, so that the composite resultant signal represents the degree of attenuation by moisture of the transmitted signal; and the resultant signal is thus a function of the quantity and mass of moisture in the representative portion of the fuel which is penetrated by the microwaves.

The microwave transmitter 104 and receiver 102 may be exponential horn type transducers which are disposed on opposite sides of the belt 10 to scan but a fraction of the belt width. Therefore the moisture mass signal produced by reducing the signal from the biasing source 108 by the output of the receiver 102, is preferably amplified by an amplifier 106 to boost this composite signal so that it may become indicative of the moisture content of the fuel which is distributed across the total width of the belt, and so that signal strength output of amplifier 106 corresponds in magnitude to the signal strength output of amplifier 25 for equal units of fuel weight measurement. In other words, if a 10 millivolt output from amplifier 25 indicates that there are 10 pounds of moist coal on the belt for a given area extending across the width of the belt, and if the moisture content of the coal for the same area is determined by test to be 10%, the signal strength output of amplifier 106 should be adjusted to 1 millivolt. It is also understood that ten pounds of water on the same area of the belt should then yield an output voltage of 10 millivolts from amplifier 106; and the gain of the amplifiers 25 and 106 can be adjusted to operate accordingly.

The respective output signals of the amplifiers 25 and 106 are of opposite polarity to oppose one another in the circuitry, or they may be otherwise arranged, to yield a net output or dry weight signal which is a function of the dry weight of the belt burden. The dry weight signal generated by the interaction of amplifiers 106 and 25 is delivered to the multiplier unit 30 together with the feeder speed signal from the tachometer generator 24 for conversion to a dry rate signal which is compared by the summing unit 32 with the load demand rate signal. The summing unit 32 sends an error signal to the drive controller 34 which responds in relation to the load demand signal to adjust the speed of the belt 10 through a change of rotational speed of the motor 12 until the actual rate of feeding equivalent dry fuel meets the demand rate for fuel.

With the modified apparatus of FIG. 3 it is now possible to determine and control the fuel feeding rate in terms of the heat equivalent of dry fuel, whereas conventional belt feeders such as those of the gravimetric type determine and control fuel feeding rate without regard to the moisture content of the fuel. Thus, with this improvement the firing equipment 22 will receive fuel quantities on the basis of dry fuel. And, where a plurality of firing components having respective feeders are operating in a single plant in response to one demand signal, each fuel firing component can be controlled as aforesaid to produce substantially identical heat release rates.

Although the invention has been shown specifically as applicable to cyclone fired steam generators, it is to be understood that the invention can be practiced by a similar arrangement wherein coal is fed first to a pulverizer for processing prior to delivery to a furnace.

What is claimed is:
1. In a steam generating plant, the combination of:
 (a) fuel burning means,
 (b) means for feeding fuel to said fuel burning means at a selectively adjustable speed,
 (c) means for producing a first signal which is a function of the desired rate of feeding fuel,
 (d) a radioactive source of penetrative radiation for penetrating the fuel conveyed by said fuel feeding means,
 (e) means responsive to fuel feeding speed and the degree of radioactive penetration of the fuel being fed for producing a second signal which is a function of the actual fuel feeding rate,
 (f) and means responsive to any difference between said first and second signals for adjusting the fuel feeding speed of said fuel feeding means so that the actual fuel feeding rate more nearly corresponds to the desired fuel feeding rate.

2. The combination according to claim 1 wherein said fuel feeding means includes a conveyor belt movable in horizontal direction, said second signal producing means includes a radiation detector which generates an electrical signal, the magnitude of which varies in accordance with the density of impinging radiation from said radioactive source, and said radioactive source and said radiation detector are disposed transversely of said belt on opposite sides thereof and in spaced relationship with one another.

3. In a steam generating plant, the combination of:
(a) fuel burning means,
(b) a plurality of means for feeding fuel to said fuel burning means,
(c) means independently associated with each fuel feeding means for selectively adjusting the feeding speed thereof,
(d) means producing demand rate signals which are functions of the desired fuel feeding rates of the respective fuel feeding means,
(e) a radioactive source of penetrative radiation for penetrating the fuel conveyed by each of said fuel feeding means,
(f) means operatively associated with each fuel feeding means and responsive to fuel feeding speed and the degree of radioactive penetration of the fuel being fed for producing an actual rate signal which is a function of the actual fuel feeding rate,
(g) and control means responsive to any difference between the actual and demand rate signals of each fuel feeding means and operatively associated with said speed adjusting means for effecting an operating speed of said fuel feeding means at which the actual rate of feeding fuel to said fuel burning means more nearly corresponds to the desired fuel feeding rate.

4. The combination according to claim 3 wherein each of said fuel feeding means includes a horizontally movable conveyor belt, said actual rate signal producing means includes a radiation detector vertically spaced from said radioactive source, said detector and said source being disposed transverse to the direction of movement of said belt and on opposite sides thereof, whereby the fuel moving on said belt is penetrated by radiation from said source and radiation unabsorbed by said fuel impinges upon said detector.

5. The combination according to claim 3 wherein the demand rate signals produced by the demand rate signal producing means are of equal magnitude, whereby each of said fuel feeding means feeds fuel at the same mass rate regardless of variations in density of the fuel fed thereby.

6. The combination according to claim 3 wherein each of said fuel feeding means includes a variable speed electric motor and a conveyor belt driven thereby, said motor being operatively associated with said control means to be driven at a speed selected thereby.

7. The combination according to claim 6 wherein the actual rate signal producing means associated with each of said fuel feeding means includes a tachometer generator driven by said motor to produce an electric speed signal, a radiation detector which generates an electric fuel density signal, the magnitude of which varies in accordance with the density of radiation from said radioactive source which is unabsorbed by said fuel and impinges upon said detector, and means for multiplying said speed signal and said fuel density signal to produce said actual rate signal.

8. The combination according to claim 6 wherein said fuel burning means includes a fuel firing component for each conveyor belt arranged to be fed thereby independently of the other fuel feeding means, with said fuel firing components supplying heat to a common furnace chamber.

9. The combination according to claim 1 including a microwave transmitter adapted to beam microwaves through at least a portion of the fuel being conveyed whereby said microwaves are attenuated by the moisture in said fuel, a microwave receiver for receiving said microwaves after their passage through the fuel and the moisture in said fuel, and means responsive to the degree of attenuation of said microwaves by the moisture in said fuel for converting said second signal into a signal which is a function of the actual dry fuel feeding rate, whereby the actual fuel feeding rate is determined and controlled on the basis of dry fuel.

10. The combination according to claim 3 including a microwave transmitter for each fuel feeding means adapted to beam microwaves through at least a portion of the fuel being conveyed thereby whereby said microwaves are attenuated by the moisture in said fuel, a microwave receiver for receiving said microwaves after their passage through the fuel and the moisture in said fuel, and means responsive to the degree of attenuation of said microwaves by the moisture in said fuel for converting said actual rate signal into a function of the rate at which dry fuel is fed by said feeding means, whereby the actual fuel feeding rate is determined and controlled at each fuel feeding means on the basis of dry fuel.

11. The combination according to claim 1 including:
(h) means for producing a microwave signal attenuated by the moisture content of the fuel, and
(i) means responsive to the attenuation of said signal for adjusting the fuel feeding speed.

References Cited

UNITED STATES PATENTS

| | | | |
|---|---|---|---|
| 2,623,698 | 12/1952 | Dickey | 110—103 X |
| 2,679,979 | 6/1954 | Bristol | 110—103 X |
| 2,962,150 | 11/1960 | Haley et al. | 222—55 X |
| 2,955,206 | 10/1960 | Spergel et al. | |
| 3,007,424 | 11/1961 | Walker | 110—101 |
| 3,064,357 | 11/1962 | Butters. | |
| 3,148,971 | 9/1964 | McDonald et al. | 250—43.5 |
| 3,222,964 | 12/1965 | Stadlin | 198—37 X |
| 3,236,358 | 2/1966 | Gieskieng | 198—37 |
| 3,255,975 | 6/1966 | Malin et al. | 250—43.5 |
| 3,278,747 | 10/1966 | Ohmart | 250—83.3 |

FREDERICK L. MATTESON, JR., *Primary Examiner.*

H. B. RAMEY, *Assistant Examiner.*